June 17, 1958  J. E. FELDMAN  2,838,867
FISH CATCHING LURE
Filed June 24, 1957
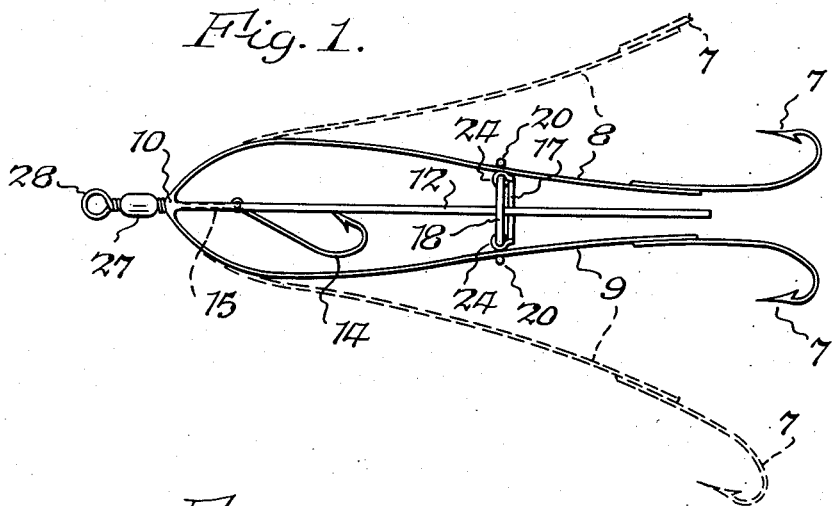
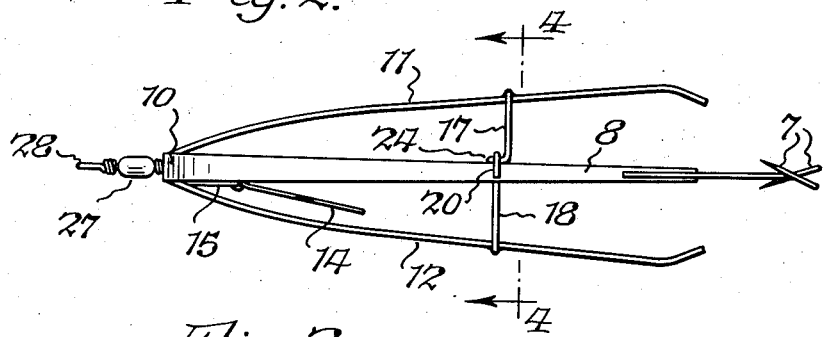
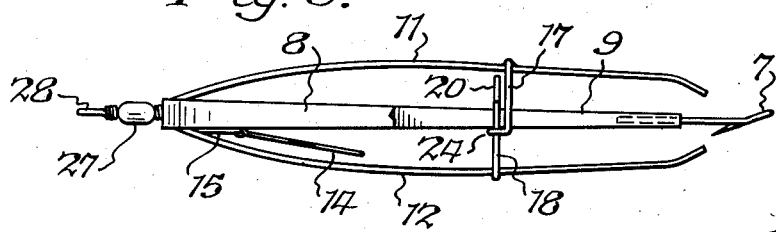
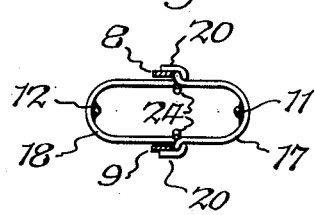
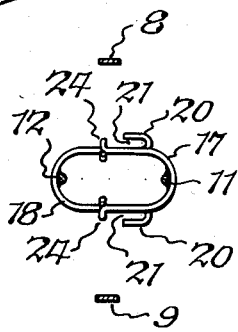
INVENTOR.
John E. Feldman
BY Parker & Prodinow,
Attorneys.

United States Patent Office 2,838,867
Patented June 17, 1958

2,838,867
FISH CATCHING LURE
John E. Feldman, East Amherst, N. Y.

Application June 24, 1957, Serial No. 667,350

4 Claims. (Cl. 43—36)

This invention relates to improvements in lures for use in connection with catching fish.

It is well known that when fish have bitten on a hook or series of hooks, they frequently are able to disengage themselves from the hook or hooks by twisting, wiggling or changing their direction of swimming. Also fish frequently bite off a part of the bait without becoming caught on the hook.

One of the objects of this invention is to provide an improved fish lure of the kind in which the hooks are yieldingly sprung outwardly when a fish bites the lure so that the struggling of the fish will cause the hooks to be embedded deeper in the fish's mouth.

Another object of this invention is to provide a lure to which a live bait, such as a minnow, may be attached, and which has hooks which are held in close proximity to each other by means of detents which release the hooks to permit them to spring outwardly when the detents are pressed toward each other by a fish.

A further object is to provide a fish lure in which the bait is partly enclosed by part of the lure so that fish cannot bite off a part of the bait without releasing the hooks and becoming caught.

Other objects and advantages will be apparent from the following description of some embodiments of the invention, and the novel features will be particularly pointed out hereinafter in connection with the appended claims.

In the accompanying drawing:

Fig. 1 is a side view of my improved lure showing in full lines the fish hooks in their inner or inoperative positions and in broken lines the outer positions of the same.

Fig. 2 is a top view of the lure shown in Fig. 1.

Fig. 3 is a similar view showing the detents when moved toward each other.

Fig. 4 is a transverse, sectional view thereof on line 4—4, Fig. 2, showing the detents in position to hold the hooks in close proximity to each other.

Fig. 5 is a view similar to Fig. 4 except that Fig. 5 shows the position of the detents when they have released the hooks.

My improved lure includes a pair of fish hooks 7 of any usual or suitable type and which are securely mounted on the outer ends of a pair of resilient arms 8 and 9, the other ends of which are secured together at 10. The spring arms 8 and 9 are so mounted that they tend normally to spring outwardly in the broken line positions shown in Fig. 1. In the particular construction illustrated by way of example only two spring arms and hooks are shown, but it will be obvious that more hooks and spring arms may be provided if desired.

The spring arms are normally held in their inner positions, as shown in full lines in Fig. 1 by means of a pair of detent arms 11 and 12 each having one end which is welded or otherwise secured to the common connecting point or junction 10. These detent arms are arranged at approximately 90 degrees from the spring arms 8 and 9 and the spring arms and detent arms are preferably bowed outwardly from their common junction point 10, so as to leave between the arms a space for bait. For this purpose a small hook 14 is provided which may be pivotally mounted on a short arm 15 and also rigidly secured to the junction point 10 and arranged approximately in the middle portion of the lure. A minnow or other live bait may be attached to the hook 14 so that this bait will be arranged more or less in a cage formed by the four arms 8, 9, 11 and 12, which extend along four sides of the bait.

The detent arms are also made of spring material so that their free ends tend to swing outwardly. These detent arms are provided with suitable means for retaining the spring arms 8 and 9 in their inner positions as shown in full lines in Fig. 1 and in Figs. 2 and 4. The means for retaining the spring arms, which are shown by way of example in the drawings, include a pair of approximately U-shaped or forked members, one of these members, 17, being secured to one of the arms, and the other member 18 to the other arm. The outer ends of the legs of the U-shaped member 18 are bent back on themselves at their ends and spaced from the legs as shown at 20 to form channel shaped spaces or recesses 21 into which adjacent parts of the spring members 8 and 9 may be inserted. The other U-shaped member 17 is provided at the outer ends of its legs with loops 24 or eyes which extend about the legs of the U-shaped member 18. These loops may be formed by twisting the ends of the legs of the U-shaped member 17 about the legs of the member 18. Since the detent arms 11 and 12 normally are urged outwardly, the loops 24 in their normal positions will extend into and be yieldingly retained in the inner portions of the channels 21 formed by the legs of the other U-shaped member.

When the lure has been provided with bait on the hook 14 and is ready to be used, the spring arms 8 and 9 are pressed toward each other and inserted into the channels 21 of the U-shaped member 18. The parts will then be in the positions shown in Figs. 2 and 4. However when a fish attempts to seize the bait, it presses the detent arms toward each other so that the loops 24 will slide toward the open ends of the channels 21 and push the spring arms 8 and 9 out of these channels so that they can move into their outer or open positions. As soon as pressure on the detent arms is discontinued, the loops 24 will move back into the inner ends of the channels 21 so that the lure is ready to have the spring arms 8 and 9 inserted into the channels.

The spring and detent arms are bowed or bent outwardly from their connection at 10 and thus form a space to receive the bait. These arms consequently will be arranged along four sides of the bait and thus serve the further purpose of protecting the bait against being bitten off by a fish or ripped off by contact with weeds or other objects in the water. If a fish attempts to bite off a part of the bait, he will trip the detent arms which extend rearwardly beyond the bait, and be caught.

27 represents the usual swivel which may be connected with the junction 10 of the arms of the lure, and 28 represents a loop or ring to which a line or leader may be secured.

It will be understood that various changes in the details, materials and arrangements of parts, which have been herein described and illustrated in order to explain the nature of the invention, may be made by those skilled in the art, within the principle and scope of the invention, as expressed in the appended claims.

I claim:

1. A fish lure comprising a pair of outwardly urged spring arms, fish hooks on the outer ends of said arms, a pair of outwardly urged detent arms arranged approximately midway between said first mentioned arms, all of said arms being connected together at one end and the other ends being free to swing outwardly, said detent arms having means for holding said spring arms in close proximity to each other, including open ended channel-shaped recesses on one of said detent arms into which portions of said spring arms may enter when pressed toward each other, the other of said detent arms having parts extending into the channel-shaped recesses of the first detent arms and yieldingly held in the inner ends of said recesses, whereby when said detent arms are moved toward each other, said parts in said channel-shaped recesses move said spring arms out of said recesses to permit the hooks to spring outwardly to embed themselves in a fish.

2. A fish lure comprising a pair of outwardly urged spring arms, fish hooks on the outer ends of said arms, a pair of outwardly urged detent arms arranged approximately midway between said first mentioned arms, all of said arms being connected together at one end and the other ends being free to swing outwardly, said detent arms having means for holding said spring arms in close proximity to each other, including open ended channel-shaped recesses on one of said detent arms into which portions of said spring arms may enter when pressed toward each other, the other of said detent arms having parts extending into the channel-shaped recesses of the first detent arms and yieldingly held in the inner ends of said recesses, whereby when said detent arms are moved toward each other, said parts in said channel-shaped recesses move said spring arms out of said recesses to permit the hooks to spring outwardly to embed themselves in a fish and means for securing bait in the space between said spring and detent arms.

3. A fish lure comprising a pair of outwardly urged spring arms, fish hooks on the outer ends of said arms, a pair of outwardly urged detent arms arranged approximately midway between said first mentioned arms, all of said arms being connected together at one end and the other ends being free to swing outwardly, one of said detent arms having a substantially U-shaped member secured thereto, said U-shaped member having the ends thereof bent to form open ended channels, the other detent member having a U-shaped member secured thereto with its ends looped around the arms of the other U-shaped member, said looped ends extending into said channels and being yieldingly held therein, said channels being formed to receive portions of said spring arms through the open ends thereof, said detent arms, when pressed toward each other causing the looped ends of one detent arm to move said spring arms out of said channels to enable the ends thereof having said hooks to spring outwardly.

4. A fish lure according to claim 3 and including a small hook for live bait secured to the connected ends of said arms.

References Cited in the file of this patent

UNITED STATES PATENTS 886,794     Gilmore _____ May 5, 1908